(12) United States Patent
Chi et al.

(10) Patent No.: US 8,190,749 B1
(45) Date of Patent: May 29, 2012

(54) SYSTEMS AND METHODS FOR ACCESSING AN INTERACTION STATE BETWEEN MULTIPLE DEVICES

(75) Inventors: Liang-Yu (Tom) Chi, San Francisco, CA (US); Sanjay Mavinkurve, Seattle, WA (US); Luis Ricardo Prada Gomez, Hayward, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/223,797

(22) Filed: Sep. 1, 2011

Related U.S. Application Data

(60) Provisional application No. 61/506,957, filed on Jul. 12, 2011.

(51) Int. Cl.
*G06F 15/16* (2006.01)
(52) U.S. Cl. ........ 709/227; 709/201; 709/203; 709/217; 709/218; 709/219; 709/226
(58) Field of Classification Search .................. 709/201, 709/203, 217–219, 226, 227
See application file for complete search history.

(56) References Cited

U.S. PATENT DOCUMENTS

| | | | |
|---|---|---|---|
| 6,349,337 B1 | 2/2002 | Parsons, Jr. et al. | |
| 6,710,753 B2 | 3/2004 | Gillespie et al. | |
| 6,983,370 B2 | 1/2006 | Eaton et al. | |
| 7,103,906 B1 | 9/2006 | Katz et al. | |
| 7,191,233 B2 * | 3/2007 | Miller | 709/227 |
| 7,415,522 B2 | 8/2008 | Kaluskar et al. | |
| 7,552,265 B2 | 6/2009 | Newman et al. | |
| 7,676,583 B2 | 3/2010 | Eaton et al. | |
| 7,716,281 B2 | 5/2010 | Lin et al. | |
| 7,809,842 B2 | 10/2010 | Moran et al. | |
| 7,899,915 B2 * | 3/2011 | Reisman | 709/228 |
| 7,948,451 B2 | 5/2011 | Gustafsson et al. | |
| 2003/0026461 A1 | 2/2003 | Hunter | |
| 2003/0046401 A1 * | 3/2003 | Abbott et al. | 709/228 |
| 2004/0176143 A1 * | 9/2004 | Willins et al. | 455/569.1 |
| 2006/0146767 A1 | 7/2006 | Moganti | |
| 2007/0220108 A1 * | 9/2007 | Whitaker | 709/217 |
| 2007/0245048 A1 | 10/2007 | Mesut et al. | |
| 2009/0013052 A1 * | 1/2009 | Robarts et al. | 709/206 |
| 2009/0319672 A1 * | 12/2009 | Reisman | 709/227 |

(Continued)

OTHER PUBLICATIONS

"IPTV Session Mobility" by Mas et al. Ericsson Research and Rittwik et al. AT&T Labs Research, 180 Park Ave, Florham Park, NJ 07932, Jun. 12, 2009, Retrieved from the Internet: http://www.ericsson.com/res/thecompany/docs/journal_conference_papers/service_layer/IPTV_Session_Mobility.pdf.

(Continued)

*Primary Examiner* — Liangche A Wang
(74) *Attorney, Agent, or Firm* — McDonnell Boehnen Hulbert & Berghoff LLP

(57) ABSTRACT

The present application discloses systems and methods for accessing digital content between multiple devices. The systems and methods may be directed to providing access to an interaction with a first application on a head-mounted display (HMD) to a second device. Contextual information relating information of the HMD and information associated with the interaction to describe an interaction state may be stored. A second device may be selected upon which the interaction state may be accessed and a determination of attributes of the second device may be made. The HMD may transfer to the second device the stored contextual information such that the second device may provide via the second application access to the interaction state. Information associated with a user input to the first application may also be transferred. In one example, the contextual information may describe an identified occurrence of digital content accessed via the first application.

19 Claims, 11 Drawing Sheets

U.S. PATENT DOCUMENTS

| | | | |
|---|---|---|---|
| 2009/0320073 A1* | 12/2009 | Reisman | 725/51 |
| 2010/0079356 A1 | 4/2010 | Hoellwarth | |
| 2010/0120585 A1* | 5/2010 | Quy | 482/8 |
| 2010/0174801 A1 | 7/2010 | Tabaaloute | |
| 2010/0313225 A1 | 12/2010 | Cholas et al. | |
| 2011/0128364 A1* | 6/2011 | Ono | 348/78 |
| 2011/0191432 A1* | 8/2011 | Layson, Jr. | 709/206 |
| 2011/0249122 A1* | 10/2011 | Tricoukes et al. | 348/158 |

OTHER PUBLICATIONS

"SSIP: Split a SIP session over multiple devices" by Min-Xiou Chen et al. Feb. 9, 2006, Retrieved from www.sciencedirect.com.

"MPEG-21 Session Mobility on Mobile Devices" by Frederik De Keukelaere et al. Multimedia Lab, Department of Electronics and Information Systems, Ghent University-IBBT, Sint-Pietersnieuwstraat 41, B-9000 Ghent, Belgium, 2005, Retrieved from the Internet: http://citeseerx.ist.psu.edu/viewdoc/download?doi=10.1.1.68.6361&rep=rep1Mype=pdf, Jun. 27, 2011.

HP's Touch to Share eyes-on, starring the TouchPad and HP Pre 3 (video)—http://www.engadget.com/2011/02/09/hps-touch-to-share-eyes-on-starring-thetouchpad-and-hp-pre-3/.

Pastefire app, Desktop-to-iPhone smart copy/paste for everyone—http://www.pastefire.com, Aug. 2011.

* cited by examiner

Computer Program Product 1200

Signal Bearing Medium 1201

Program Instructions 1202

- storing contextual information relating information of a head-mounted display (HMD) and information associated with a first application on the HMD to describe an interaction state on the HMD;
- selecting a second device upon which the interaction state may be accessed via a second application;
- making a determination of attributes of the second device; and
- based on the determination, the HMD transferring to the second device the stored contextual information and information associated with a user input to the first application on the HMD such that the second device may provide via the second application access to the interaction state according to the user input to the first application

| Computer Readable Medium 1203 | Computer Recordable Medium 1204 | Communications Medium 1205 |

FIGURE 12

SYSTEMS AND METHODS FOR ACCESSING AN INTERACTION STATE BETWEEN MULTIPLE DEVICES

CROSS-REFERENCE TO RELATED APPLICATIONS

This application claims the benefit of U.S. Provisional Application No. 61/506,957, filed Jul. 12, 2011, the entirety of which is herein incorporated by reference.

FIELD

This disclosure relates to a transfer of digital content, and in some examples, to the transfer of digital content between various devices.

BACKGROUND

Innovations in digital processing and computing have increased an amount of digital content available by way of the internet, for example. Digital content in the form of webpages, multimedia files, and other documents were made accessible to internet users accessing the content via a computer. Advances in the processing speed of computers and bandwidth capabilities of communication links have further increased the ease of access to the flood of digital content.

Simultaneous advances in consumer electronics and cellular and wireless networking have led to the prevalent introduction of portable and other devices deviating from a desktop computer. With the prevalence of broadband network connections, access to digital content is expected anywhere anytime. Technological improvements have created laptop computers, personal digital assistants (PDAs), cellular telephones and smartphones, portable media devices with Wi-Fi connectivity, tablet computers, and other devices, for example.

As these devices have been introduced into the stream of commerce, mechanisms of interacting with digital content on the devices have been developed. Each device may possess a specialized user interface for accessing and interacting with digital content. Applications specific to PDAs, smartphones, tablet computers, and other portable devices can be created to process and interact with the digital content. Software for applications such as receiving and sending email, downloading or streaming video and audio files, and browsing the internet may enable users to easily interact with digital content on the devices.

SUMMARY

This disclosure may disclose, inter alia, devices and methods for transferring information describing an interaction state between devices.

In one example, a method for transferring information describing an interaction state on a head-mounted display (HMD) to a second device is provided. The method includes storing contextual information which may relate information associated with an interaction with a first application and information of the HMD to describe the interaction state. The method further includes selecting a second device upon which the interaction state may be accessed with a second application using the stored contextual information. According to the method, a determination of attributes of the second device may be made. The method also includes transferring, based on the determination, to the second device: the stored contextual information and information associated with a user input to the first application on the HMD such that the second device may provide via the second application access to the interaction state according to the user input to the first application.

In another example, a non-transitory computer-readable medium with instructions stored therein is provided. The instructions may be executable by a computing device for transferring information describing an interaction state on a head-mounted display (HMD) to a second device. The instructions may be further executable for storing contextual information which may relate information associated with an interaction with a first application and information of the HMD to describe the interaction state. The instructions may also be executable for selecting a second device upon which the interaction state may be accessed with a second application using the stored contextual information. According to the instructions, a determination of attributes of the second device may be made. The instructions may be further executable for transferring, based on the determination, to the second device: the stored contextual information and information associated with a user input to the first application on the HMD such that the second device may provide via the second application access to the interaction state according to the user input to the first application.

In another example, a head-mounted display (HMD) is provided. The HMD involves a memory and a processor coupled to the memory. The HMD further includes, instructions executable by the processor, stored in the memory. The instructions may be executable by a computing device for transferring information describing an interaction state on a HMD to a second device. The instructions may be further executable for storing contextual information which may relate information associated with an interaction with a first application and information of the HMD to describe the interaction state. The instructions may also be executable for selecting a second device upon which the interaction state may be accessed with a second application using the stored contextual information. According to the instructions, a determination of attributes of the second device may be made. The instructions may be further executable for transferring, based on the determination, to the second device: the stored contextual information and information associated with a user input to the first application on the HMD such that the second device may provide via the second application access to the interaction state according to the user input to the first application.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 12 is a schematic illustrating a conceptual partial view of an example computer program product that includes a computer program for executing a computer process on a computing device, arranged according to at least some embodiments presented herein.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, devices and methods for transferring information describing an interaction state between devices. The devices and methods may be directed to providing access to an interaction state accessed on a head-mounted display (HMD) with a first application, to a second device with a second application. In one example, contextual information relating information of the HMD and information associated with the first application on the HMD is stored. The contextual information describes the interaction state on the HMD.

A second device upon which the interaction state may be accessed via the second application may also be selected. In one example, a determination of attributes of the second device may be made. Based on the determination, the HMD may transfer to the second device: the stored contextual information and information associated with a user input to the first application on the HMD such that the second device may provide via the second application access to the interaction state according to the user input to the first application.

Figure 1:
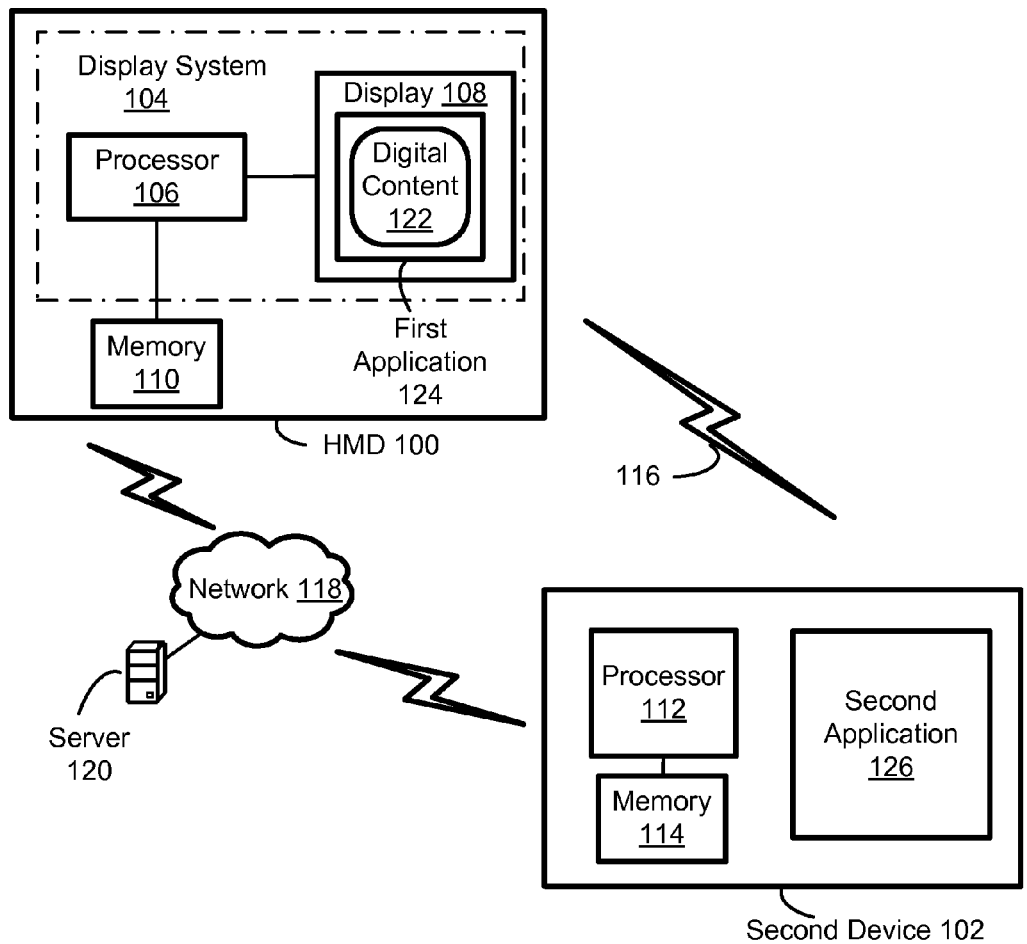
FIG. 1 illustrates an example system.

Referring now to the figures, FIG. 1 illustrates an example system. FIG. 1 shows an example of a head-mounted display (HMD) 100 transferring information to a second device 102. The HMD 100 may include a display system 104 comprising a processor 106 and a display 108. The processor 106 may be any type of processor, such as a microprocessor, digital signal processor (DSP), multicore processor, etc. The display 108 may be, for example, an optical see-through display, an optical see-around display, or a video see-through display. The HMD 100 also includes a memory 110 coupled to the processor 104. The memory 110 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis. Similarly, the second device 102 includes a processor 112 coupled to a memory 114. The HMD 100 and the second device 102 may communicate and transfer information using a communication link 116 (e.g., a wireless or wired link).

In FIG. 1, the communication link 116 is illustrated as a wireless connection. The wireless connection may include using, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Wired connections may also be used. For example, the communication link 116 may be a wired link via a serial bus such as a universal serial bus or a parallel bus. A wired connection may be a proprietary connection as well.

In one example, the HMD 100 may transfer information to the second device 102 directly. In another example, the HMD 100 may transfer information to the second device via a network 118 and a server 120. The network 118 may be a wireless network, local network, computer network, or any of a variety of types of networks.

In one example, the HMD 100 may identify digital content 122 accessed via a first application 124. The digital content 122 may include any content published or distributed in digital form, including text, data, audio, video, images, software, or any number of other forms of content. The first application 124 may allow interaction with the digital content 122. For example, the first application 124 may include an internet browser, an email application, photo browser, etc., and can include any application residing on or accessible via the HMD 100.

The second device 102 may be able to access the digital content 122 via a second application 126 on the second device 102. In one example, the second application 126 and first application 124 are the same application. Alternatively, the second application 126 may include additional functionality as compared to the first application 124.

Figure 2:
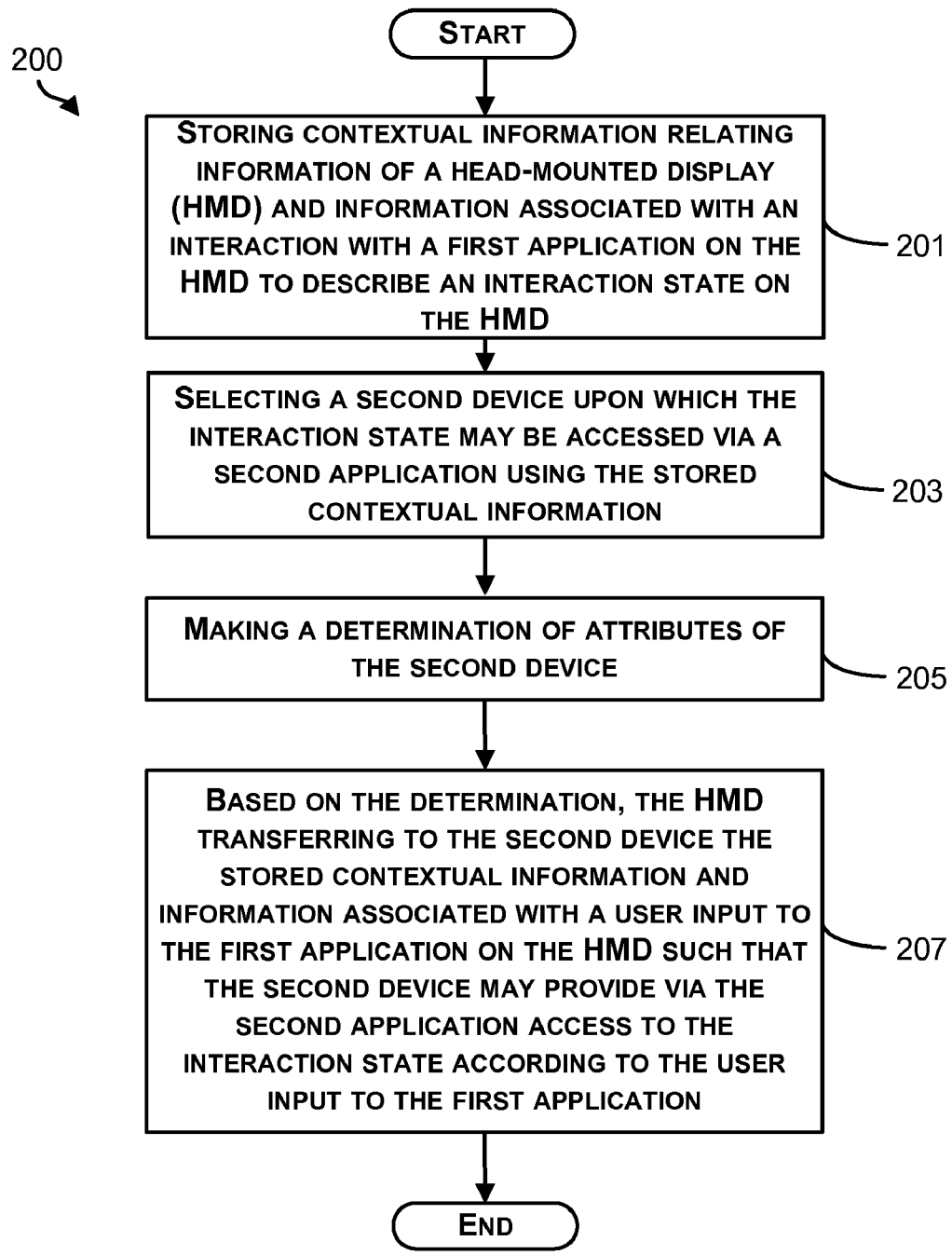
FIG. 2 is an example block diagram of a method to transfer information from a head-mounted display (HMD) to a second device, in accordance with at least some embodiments described herein.

FIG. 2 is an example block diagram of a method 200 to transfer information from a HMD to a second device, in accordance with at least some embodiments described herein. The method 200 shown in FIG. 2 presents an embodiment of a method that could, for example, be used by the HMD 100 of FIG. 1. Method 200 may include one or more operations, functions, or actions as illustrated by one or more of blocks 201-207. Although the blocks are illustrated in a sequential order, these blocks may also be performed in parallel, and/or in a different order than those described herein. Also, the various blocks may be combined into fewer blocks, divided into additional blocks, and/or removed from the method, based upon the desired implementation of the method.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 201, the method 200 includes storing contextual information relating information of the HMD and information associated with an interaction with a first application on the HMD to describe an interaction state on the HMD. In one example, the contextual information may include a chain of events communicating context. For example, the contextual information may include an application a user is interacting with on the HMD, a subpart of the application the interaction may be occurring within, and the location of a cursor in a subcontext of the application, among other information. The contextual information may be stored or logged as encoded information within a small data string or other type of stored information. Optionally, the encoded information may periodically be updated to a server.

In one example, contextual information may include information about the state of the HMD and the state of the first application. In some examples, the contextual information may describe an occurrence of digital content accessed on the HMD using the first application. The contextual information may be digital content consumed by a user (e.g., text that a user is reading, media graphics consumed by a user, etc.).

For example, the HMD may continually monitor interactions with digital content on the HMD in real-time. The HMD may be capable of capturing an occurrence of digital content at any instance in time. In one example, the HMD identifies occurrences of digital content when a request is initiated by a processor of the HMD. In another example, the HMD may identify occurrences of digital content at fixed intervals in time or in accordance with a pre-determined schedule. For example, a processor of the HMD may monitor a group of applications currently running on the HMD. The processor may identify an email being accessed via an email application as an occurrence of digital content. Additionally, the processor might also identify a web page accessed on an internet browser of the HMD as an occurrence of digital content.

In another example, the contextual information may describe a state of the occurrence of digital content in the first application on the HMD. The state of the occurrence of digital content may relate information of the first application and information of the HMD with the occurrence of digital content to describe a manner of accessing and interfacing with the occurrence of digital content.

In one example, the state of the occurrence of digital content may include an assessment of a functionality lacking from the HMD needed for properly or efficiently accessing and interfacing with the occurrence of digital content. For example, a user of the HMD may be accessing digital content in the form of a web page on the HMD. A first display associated with the HMD may be a low resolution display. The web page may be read on the first display from an internet browser with limited capabilities. The web page may also be detailed and provide numerous features such as videos, links, and detailed text information. The state of the occurrence of digital content, as described by the contextual information, may be such that a second device with a second higher resolution display is desirable for achieving a better experience with the web page.

In another example, the user of the HMD may be accessing an occurrence of digital content in the form of a document. The document may be an email received from a colleague. The email may be part of an email thread and include a series of emails exchanged between the user and the colleague. Information about the state of the HMD may identify that the HMD does not include an efficient input device for entering a reply message. As such, the state of the occurrence of digital content may be that a second device with an email application and better input device for typing is desirable for replying to the email message.

At block 203, the method 200 includes selecting a second device upon which the interaction state may be accessed via a second application using the stored contextual information. For example, selecting a second device upon which the interaction state may be accessed via the second application may include selecting the second device from one or more devices registered with the HMD. A user may register one or more secondary devices when initiating the HMD for the first time. Optionally, the user may also register one or more secondary devices at a later time. In one example, the HMD may be pre-setup to work with a laptop, a desktop, a first user's mobile phone, a second user's mobile phone, etc. In another example, a user may designate a second device which the user desires to transfer information to.

In one example, the HMD may select the second device. The second device may be capable of accessing an occurrence of digital content using a second application. In one example, the second device may provide more functionality than the HMD. Accessing the occurrence of digital content on the second device may provide a richer experience with the digital content for a user, compared with the experience associated with the occurrence of digital content when accessed on the HMD. For example, the second device may provide a display with a higher resolution than the HMD for viewing the occurrence of digital content. The occurrence of digital content may be an interactive map accessed on the HMD. The second device may have a higher resolution display than the HMD allowing a user to more clearly identify details and positions on the map. Furthermore, the second application used for accessing the occurrence of digital content may provide additional features when interacting with the map.

The second device may also provide an easier interaction with the occurrence of digital content as compared with the interaction with the occurrence of digital content on the HMD. For example, the second device may have a traditional mouse and keyboard connected, while the HMD may not. The second device may also provide more processing power for handling the occurrence of digital content. The second device may make use of computing resources on demand via a computer network. As such, the second device may be capable of interacting with the occurrence of digital content at a faster pace. Thus, the second device may be determined based on capabilities of the second device and/or capabilities of the second application.

In another example, the selected second device may be identified based on a history of information transferred between devices. The HMD may have stored information regarding a history of devices that the HMD has transferred information to or received information from in the past. The HMD may attempt to identify the second device from the history of devices. Additionally, the HMD may have a default second device which it seeks to identify prior to identifying any other devices. In another example, a user may also input an address or information for locating the second device.

In another example, selecting the second device upon which the interaction state may be accessed via the second application includes performing an inquiry requesting device identifier information from the second device. The second device may be configured to respond to such inquiries. The second device may provide device identifier information to the HMD. For example, the device identifier information may include a device name, device class, list of services, technical information (e.g., device features, manufacturer, etc.), or any of other possible types of information used to identify the second device.

In one example, the HMD may use the device identifier information to access a database to determine attributes of the second device. The attributes may include the device type, serial number, hardware information or specifications, software applications installed, among other possibilities. Specific examples or attributes, for example, may include a size of a display, a clock speed of a processor, a number of processors, a size of a memory, peripheral devices attached, network connectivity status, or power source information. Other examples of attributes include an indication of whether the second device is "on" or "off" or values indicating a particular setting of the second device. The HMD may also compare the attributes of the second device with attributes of the HMD.

At block 205, the method 200 includes making a determination of attributes of the second device. In one example, making the determination may include accessing a database to determine attributes of the second device. The attributes of the second device may be compared with attributes of the HMD. A determination may be made whether the second device provides an attribute that may be beneficial for accessing the interaction state given the stored contextual information. In one example, a second determination may be made of attributes of the second application. Attributes of the second application may be compared with attributes of the first application.

In one example, a database stored in the memory of the HMD may be accessed. The database may contain information about attributes of various types of devices. The HMD may determine the type of device of the second device from the device identifier and use the type to determine attributes of the second device. In another example, the database may be an online database accessed by the HMD. In another example, attributes of the second device may also be included in the device identifier information.

At block 207, the method 200 includes based on the determination, the HMD transferring to the second device the stored contextual information and information associated with a user input to the first application on the HMD. The transferred stored contextual information and information associated with the user input may allow that the second device to provide via the second application access to the interaction state according to the user input to the first application. For example, the stored contextual information and information associated with a user input of the HMD may describe a context of a user's intent to create a new project or document (e.g., an architectural drawing, a multimedia file, etc.). The HMD may transfer the information to the second device to help begin or continue creating of the new project or document.

In one example, the determination of attributes of the second device may enable the HMD to make a modification to a manner in which the interaction state is provided via the second application on the second device. Accordingly, the manner in which digital content associated with the transferred information is presented or interacted with may be modified when provided by the second device.

In one example, the stored contextual information may describe an occurrence of digital content accessed on the HMD. The HMD may transfer information associated with the occurrence of digital content, the contextual information, and information associated with a user input to the first application to the second device. The information associated with the user input may allow the second device to provide, via the second application, access to the occurrence of digital content at the state at which the digital content was provided on the HMD and according to the user input with the occurrence of digital content. In one example, the HMD may also transfer to the second device information indicating the first application used to access the occurrence of digital content. In another example, information associated with an interaction with the occurrence of digital content may also be transferred.

In one example, the user of the HMD may be accessing an occurrence of digital content in the form of a document. The HMD may transfer to the second device information associated with the document such that the second device may reply to the document via the second application.

In one example, the user input to the first application on the HMD includes a textual input. For example, the user of the HMD may be reading a document and wish to comment or reply to the document. The user may enter textual information via the first application used to access the occurrence of digital content.

In another example, the HMD may identify the occurrence of digital content. The HMD may further provide a notification to perform a transfer to the second device. For example, the HMD may identify a web page accessed on the HMD via a first display. The HMD may suggest transferring information to the second device. The HMD may transfer information associated with the webpage to the second device, such that the web page may be accessed on a second display with greater resolution than the first display.

In one embodiment, the second device may be preconfigured to receive information from the HMD based on a past interaction between the devices. In accordance with another embodiment, the HMD may request permission from the second device to transfer information to the second device prior to transferring information.

In one embodiment, the first application on the HMD may be provided as a service by a server. The information associated with the stored contextual information and the information associated with the user input may be provided as a link to the server. The link may be provided such that the second device may access the interaction state according to the user input to the first application using the link.

For example, a user may access an occurrence of digital content by initiating a session of an application through a centralized server. When the user desires to transfer information to another device, the user may indicate this to the server. When the user accesses the occurrence of digital content on another device, the user may open a second session of the application on the second device. The server may use the information about the state of the occurrence of digital content when initiating the second session. As such, the server may act as a centralized clearing house for transferring information between devices. In one example, a user may access an email account by logging into their email on the HMD. The contextual information may indicate that the user is reading an email. The HMD may then survey the contextual information describing the state of the occurrence of digital content and package the information in a link to be sent to the server. The user may later be presented with the information when opening their email on the second device.

In one example, the method 200 may include transferring the information to the second device based on a user initiated transfer of information. In another example, the method 200 may include transferring the information to the second device based on an implied change of context.

In one example, the method 200 may further include capturing an image of an environment using a camera of the HMD. A determination may be made that the image of the environment comprises an image of the second device. Responsively, the HMD may perform the transfer to the second device. For example, recognizing a user is holding the second device in an image captured by the HMD may trigger the HMD to transfer the information to the second device. Similarly, the HMD may prompt the user to transfer information to the second device upon visually recognizing the second device in the image. In one example, the HMD may recognize one or more potential second devices in the image and provide a user with an option to select the desired second device from the one or more recognized potential second devices of the image.

In one example, the method 200 may be applicable to transferring information describing an interaction state between any two devices. A first device may store contextual information relating information of the first device and information associated with an interaction with a first application on the first device to describe an interaction state on the first device. In some examples, a second device upon which the interaction state may be accessed via a second application using the stored contextual information may be selected. Similarly, a determination of attributes of the second device may be made. Based on the determination, the first device may transfer to the second device the stored contextual information and information associated with a user input to the first application on the first device. Accordingly, the second device may provide via the second application access to the interaction state according to the user input to the first application.

For example, a user may be preparing a presentation for a sales presentation on a laptop. When the user closes the laptop to leave for the sales presentation, the presentation may be presented on a tablet, mobile phone, or HMD to review on the way to the sales presentation. In another example, a window of information on a display of the second device may provide information available to the second device based on activities conducted on the first device, or optionally activities conducted on multiple devices.

In another example, the method 200 may include selecting multiple second devices, making a determination of attributes of the multiple second devices, and transferring the information to the multiple second devices.

Figure 3:
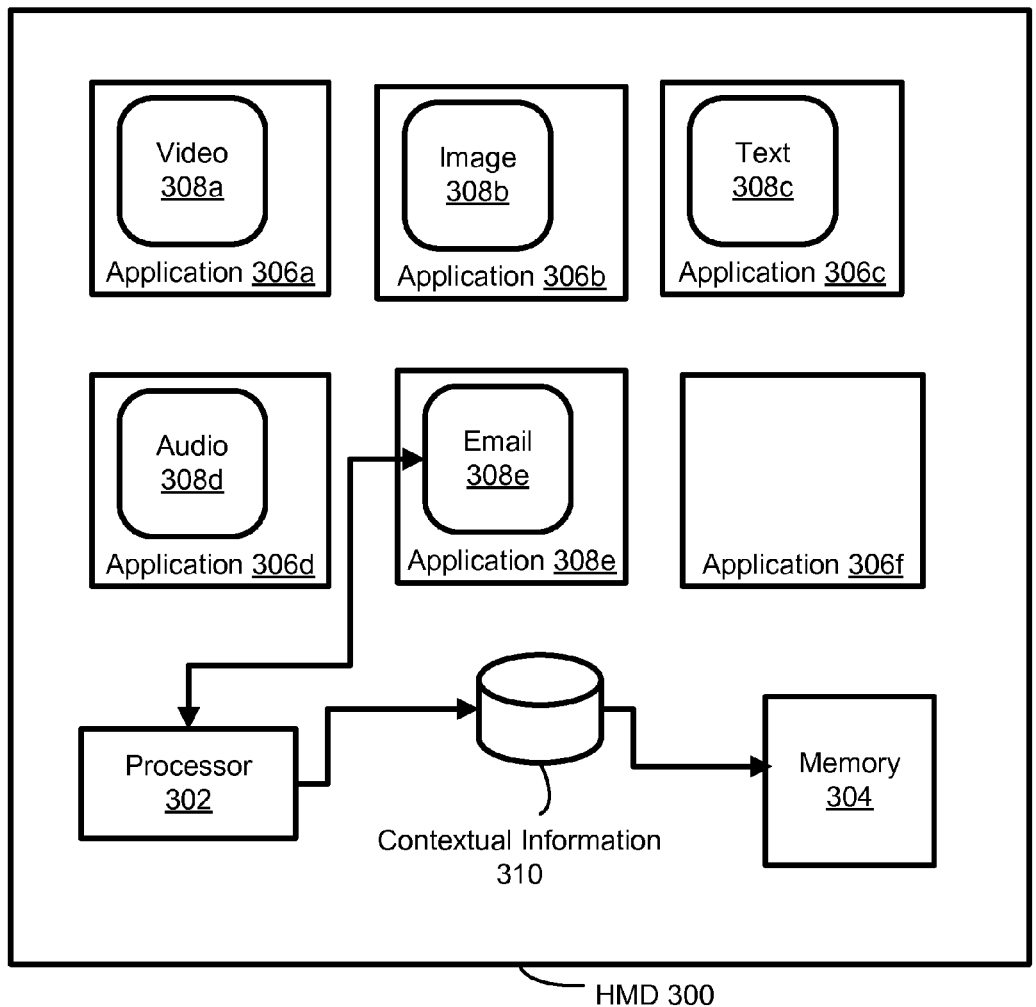
FIG. 3 illustrates an example of a HMD.

FIG. 3 illustrates an example of a HMD 300. The HMD 300 may include a processor 302 coupled to a memory 304. The processor 302 may be configured to store contextual information. The contextual information may describe an interaction state of the HMD and/or digital content may accessed by one or more of applications 306*a-f* or any application running on the HMD 300. Each of the applications 306*a-f* may optionally be accessing and interacting with digital content 308*a-e*.

In one example, the processor 302 identifies an application 308*e* interacting with digital content 308*e* (e.g., an email) as contextual information 310. The device 300 stores the contextual information 310 in the memory 304. The contextual information 310 may be an interaction state or any occurrence of digital content accessed or interacted with by a first application. For example, an occurrence of digital content may be described as a web page viewed on an internet browser, a video streaming on a video player, an email message read using an email application, a game, etc., or any other event of interaction with a form of digital content. In another example, the HMD 300 may be configured to identify a plurality of occurrences of digital content simultaneously. The memory 304 may store occurrences of digital content for a predetermined length of time. Alternatively, the occurrences of digital content may, in some examples, be stored temporarily, and written over or erased when new occurrences of digital content are identified.

Figure 4:
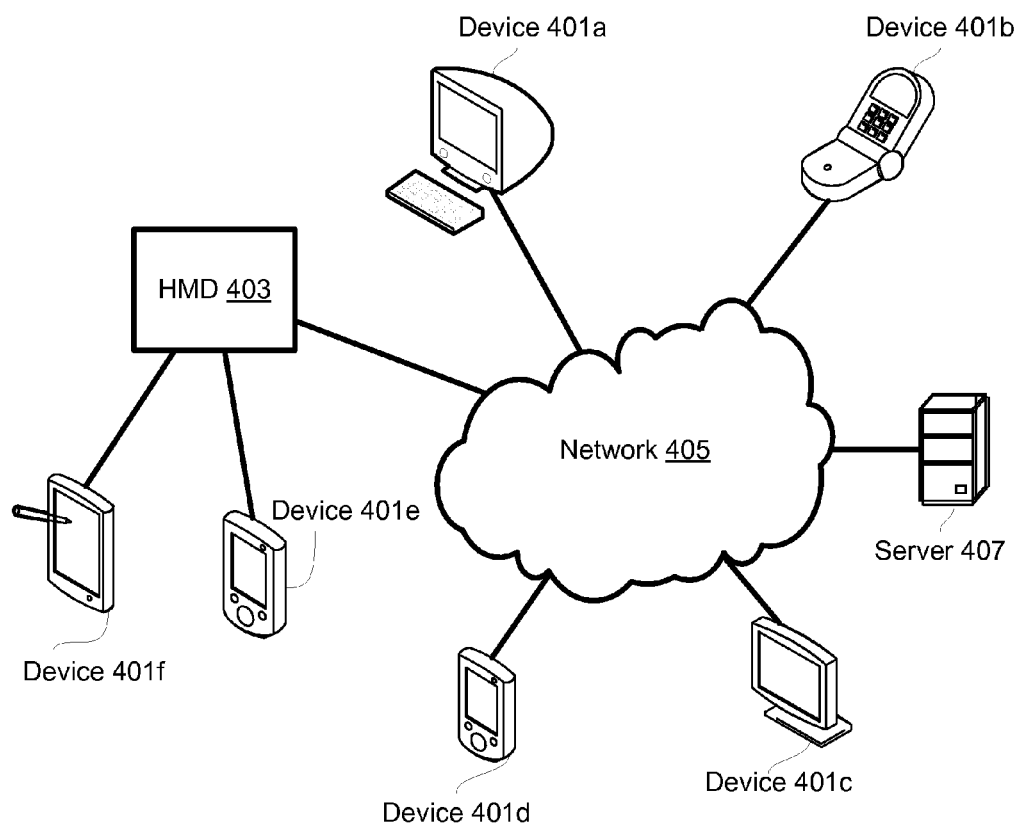
FIG. 4 illustrates an example of a plurality of connected devices, from which a HMD may select a second device.

FIG. 4 illustrates an example of a plurality of connected devices 401*a-f*, from which a HMD 403 may select a second device. In one example the HMD 403 may select a second device from the plurality of devices 401*a-f*. The second device may be connected to the HMD through a network 405 and server 407, or connected directly. The HMD 403 may determine the plurality of devices 401*a-f* which may access the interaction state via a second application. The HMD 403 may also identify the second device from the plurality of devices 401*a-f* upon which the interaction state may be accessed via the second application.

In some examples, the HMD 403 may be any HMD capable of accessing digital content and transferring data, and optionally receiving data. The plurality of devices 401*a-f* may be devices capable of accessing digital content and receiving data, and optionally transferring data. The HMD 403 and second device may be two stationary devices, two mobile devices, or any combination of stationary and mobile devices. The second device may be one of a personal computer, workstation computer, laptop computer, mobile phone, smartphone, personal digital assistant (PDA), display, tablet computer, portable media player, wearable computing device, or any of a variety of other devices. In some examples, the HMD 403 and the second device may be the same type of device.

Figure 5:
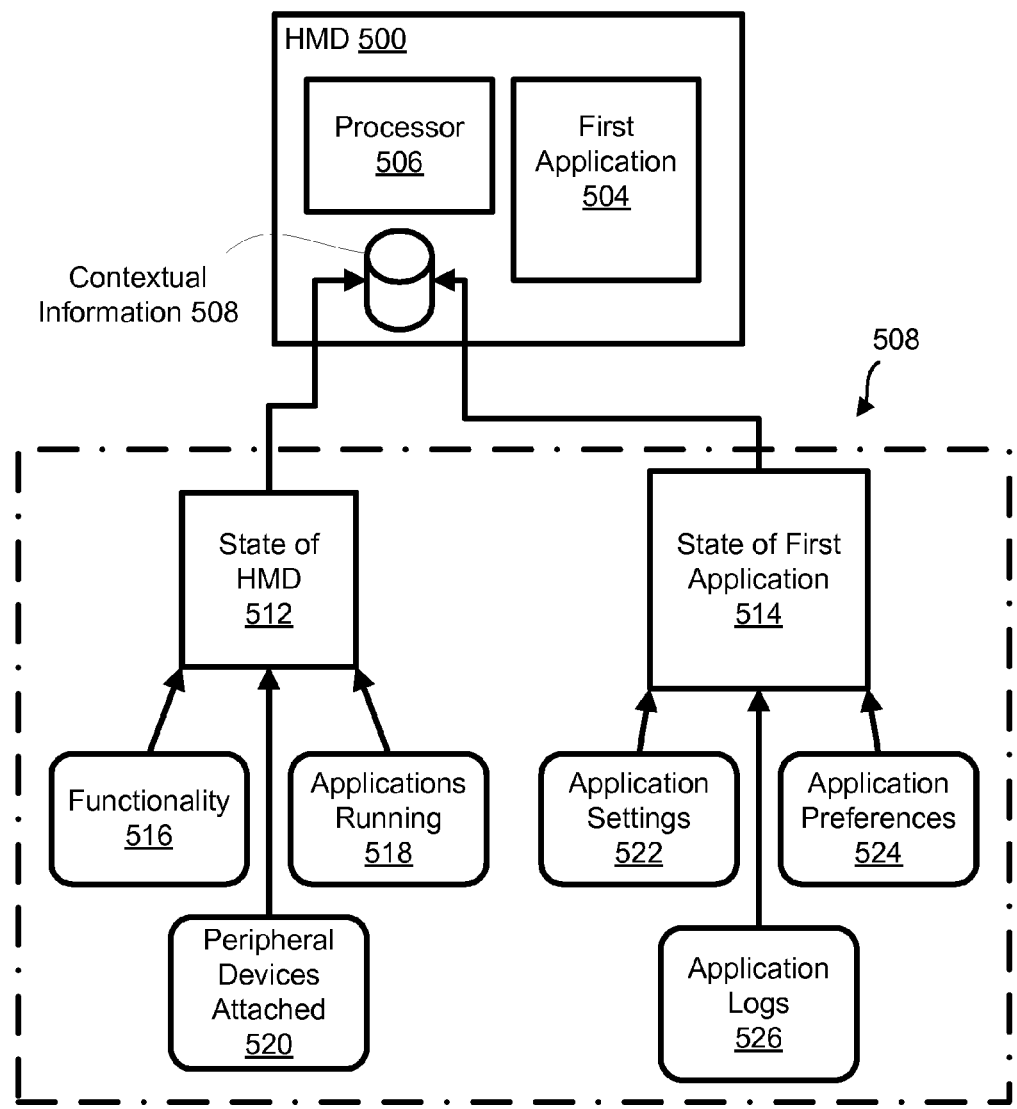
FIG. 5 illustrates an example of determining contextual information.

FIG. 5 illustrates an example of determining contextual information. In FIG. 5, the HMD 500 is interacting with a first application 504. A processor 506 of the HMD 500 determines the contextual information 508.

In some examples, the contextual information 508 includes a state of the HMD 512 and/or state of the first application 514 when the contextual information 508 was stored. The state of the HMD 512 may include information about a functionality 516 of the HMD 500. For example, the functionality 516 may describe the purpose the HMD 500 is designed to fulfill, or additionally, information about entities of the HMD 500 which may provide a predetermined functionality. An entity of the HMD 500 may include a component enabling presentation of digital content (e.g., streaming video, playing audio, etc.). In another example, an entity may represent a single application with a predetermined functionality (e.g., media player, email application, file viewer, photo editor, etc.). The state of the HMD 512 may also include information about applications running 518 on the HMD 500, or peripheral devices attached 520 to the HMD 500. Other examples of information included in the state of the HMD 512 may include information about battery life, network connectivity, operating system, drivers installed, device name, internet protocol (IP) address, event history, attributes of the HMD, or other useful contextual information describing the HMD 500.

In another example, the contextual information 508 includes the state of the first application 514. The state of the first application 514 may include a snapshot of a measure of various conditions in the first application 504 when the contextual information is stored. For example, the state of the first application 514 may include information about a size or position of a window of the first application 504, information about user-configurable application settings 522 or application preferences 524 within the first application 504, or application logs 526 of history or status messages of the first application 504. In one example, the state of the first application 514 may also include attributes of the first application 504.

Figure 6:
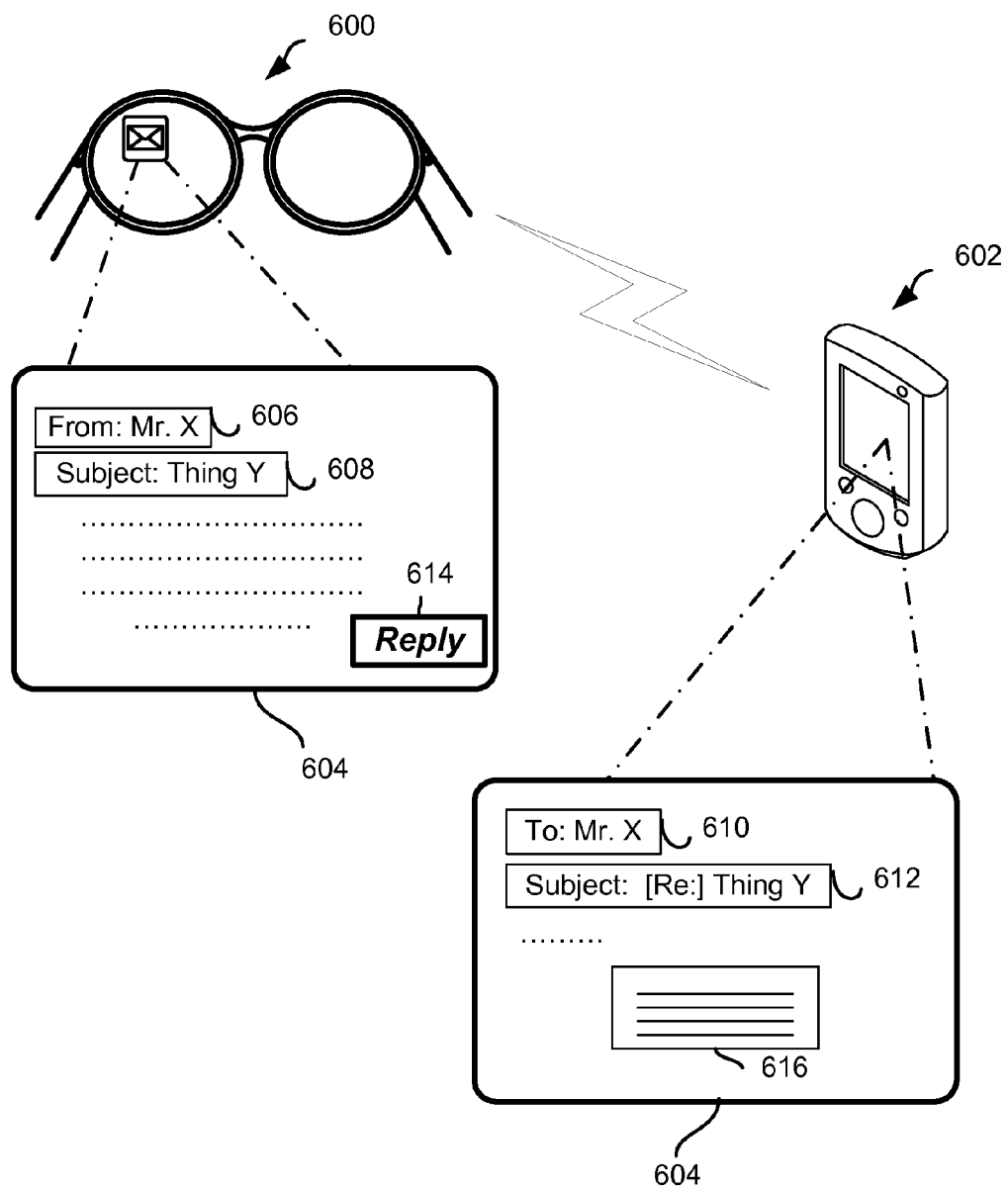
FIG. 6 illustrates another example of a HMD transferring information to a second device, in accordance with at least some embodiments described herein.

FIG. 6 illustrates another example of a HMD 600 transferring information to a second device 602, in accordance with at least some embodiments described herein. In FIG. 6, a HMD 600 is illustrated. An occurrence of digital content 604 is identified on the HMD 600. Additionally, a second device 602 is identified, capable of accessing the occurrence of digital content 604.

In one example, information associated with the occurrence of digital content 604 is transferred to the second device 602. For example, the occurrence of digital content 604 may be an email. Information about the sender 606 of the email and subject 608 of the email may be determined by the HMD 600. In some examples, the information transferred may enable the second device 602 to access the occurrence of digital content 604 at the state at which the digital content was provided on the HMD 600.

In another example, the occurrence of digital content 604 may be an email message. The HMD 600 may start a reply email message on the HMD 600. The HMD 600 may transfer the reply email message to the second device 602 to be completed. Information associated with the email message may be transferred and used to populate a reply email message on the second device 602. For example, the second device 602 may access the occurrence of digital content 604 and open a reply email that uses the information to populate a recipient field 610 and subject field 612 of the email. The reply email message may be transferred to the second device 602 such that the second device 602 is responsively in a reply mode, rather than the second device 602 being locked or presenting a home screen or window.

In one example, information associated with the occurrence of digital content 604 includes metadata. Metadata may provide information about aspects of the digital content. The aspects may include, for example, means of creation, purpose, time and date of creation, creator or author, standards used, or any of a variety of other aspects of information regarding the digital content. In another example, contextual information may also include a time stamp related to when the occurrence of digital content 604 was identified. Alternatively, if information is transferred to the second device 602, the time stamp may indicate when the transfer occurred.

In another example, information associated with an interaction with the occurrence of digital content 604 is also transferred. Information associated with an interaction may include a user input to a first application used to access the occurrence of digital content 604 on the HMD 600. For example, a user may elect to reply to an occurrence of digital content 604 in the form of an email by selecting a reply button 614. Alternatively, the user input may be textual information entered by the user to reply to the email. Upon receiving the user input, the HMD 600 may transfer information associated with the occurrence of digital content 604 and information associated with the user input to the first application to the second device 602. The second device 602 may access the occurrence of digital content 604 and open a reply email that uses the information to populate a recipient field 610 and subject field 612 of the email. A second application may be ready to accept textual input. For example, the second device may be a mobile phone, and a touchscreen keyboard 616 of the second application may be presented to the user.

In another example, information associated with an interaction with the occurrence of digital content 604 may include geographic location information of the HMD 600. For example, a global positioning system (GPS) receiver may be used to identify geographic coordinates of the HMD 600 when the occurrence of digital content 604 was accessed or identified. In another example, a location of the HMD 600 may be determined using an internet protocol (IP) address.

In another example, the HMD 600 may determine contextual information describing a state of the occurrence of digital content in the first application on the HMD 600. The state of the occurrence of digital content may relate information of the first application and information of the HMD 600 with the occurrence of digital content 604 to describe a manner of accessing and interfacing with the occurrence of digital content 604. For example, information about the first application used for accessing the occurrence of digital content 604 may reveal that an email has been open for an extended length of time and has likely been read. Information about the HMD 600 may reveal that the HMD 600 does not have an efficient input mechanism for inputting text in order to reply to an email. Therefore, the combination of the contextual information may indicate that the state of the occurrence of digital content 604 is such that a second device is desired for replying to the email. Accordingly, in some examples, given the state of the occurrence of digital content, the HMD 600 may make a determination of attributes of the second device. In one example, particular attributes for replying to an email may be evaluated.

In one embodiment, the HMD 600 may record the contextual information associated with the occurrence of digital content 604 and encode the information in the occurrence of digital content for use by the second device 602. The encoded information may be accessed by the second device 602 at a later time. The second device 602 may be capable of decoding the contextual information and using the information to access and interact with the occurrence of digital content 604 at the state at which the digital content was provided on the HMD 600. This may be accomplished, for example, by a server which encodes the information associated with the occurrence of digital content 604 in parameters of the digital content. When another device accesses the occurrence of digital content 604, the parameters may be read and used appropriately.

In one embodiment, the encoded information associated with the occurrence of digital content 604 may be read on the second device 602 by a second user. For example, a video may be recorded using the HMD 600. Contextual information identifying the first user, a geographical location of the user, and other information may be encoded with the information. The second device 602 operated by the second user may later decode the information when accessing the video.

In another embodiment, the first application used to access the occurrence of digital content 604 on the HMD 600 may be a mobile version of the second application used to access the occurrence of digital content 604 on the second device 602. As such, the first application may provide less functionality than the first application. The HMD 600 and second device 602 may be, in some examples, connected directly. As such, the devices would not require the use of a server.

In another embodiment, the second device 602 may be capable of transferring information to the HMD 600 as well. The second device may package or load files and transfer information about the occurrence of digital content to the HMD 600. Therefore, in some examples, the transfer of information between the HMD 600 and the second device 602 may be bidirectional. For example, the HMD 600 may receive from the second device 602 information associated with the occurrence of digital content 604. The HMD 600 may also receive contextual information and information associated with a user input to the second application on the second device 602 such that the HMD 600 may resume access to the occurrence of digital content 604 on the HMD 600 via the first application. Similarly, the second device 602 may store contextual information of an interaction state and transfer the information to the HMD 600. The HMD 600 may provide via the first application access to an interaction state according to the user input to the second application.

Figure 7:
FIG. 7 illustrates an example of a table for making a determination of attributes.

FIG. 7 illustrates an example of a table for making a determination of attributes. Table 701 may be accessed in a memory, which may be stored in a HMD 703. In other examples, the table 701 may be represented as a list, a tree, lookup table, or any of a variety of other data structures. The table 701 may also be stored in a memory on a server or a database accessed remotely. Table 701 may, for example, include more or less columns or rows than those provided in FIG. 7.

In FIG. 7, the columns provide example computing devices to be compared. The rows of FIG. 7 represent potential attributes which may be checked against. In FIG. 7, a check mark provided at an intersection between a computing device and an attribute indicates the computing device includes the attribute. The potential attribute may be an attribute associated with the computing device or an application on the computing device.

In one example, the table 701 may be used for making a determination of attributes of a second device. The HMD 703 may transfer information associated with an occurrence of digital content to the second device, based on the determination. For example, the HMD 703 may identify one or more other computing devices for making a determination of attributes. The HMD 703 may determine attributes of one or more of a tablet 705, a smartphone 707, a desktop computer 709, among other computing devices. The determination of attributes may be made by accessing the table 701 in the memory of the HMD 703.

In one embodiment, attributes of the second device may be compared with attributes of the HMD 703. The HMD 703 may perform the transfer if the second device has at least one of the following: a larger display than the HMD 703, more processing power than the HMD 703, more peripheral devices than the HMD 703, more software applications than the HMD 703, and/or more network connections than the HMD 703. Other examples of compared attributes that may provoke the HMD 703 to perform the transfer may also be possible and become apparent based on a state of an occurrence of digital content.

In one example, the HMD 703 may have a limited number of peripheral devices. The HMD 703 may compare attributes with the second device and determine the second device may offer more peripheral devices. The second device may be the desktop computer 709, which according to the table 701 has a keyboard 711. As such, the HMD 703 may perform the transfer, based on the determination of attributes of the desktop computer 709. In another embodiment, examples of attributes compared may include the presence of a network connection 713, or a touchscreen 715, among other possible attributes.

In another embodiment, a second determination of attributes of the second application may be made. An occurrence of digital content may be accessed on the HMD 703 via a first application. Attributes of the second application may be compared with attributes of the first application on the HMD 703. Based on the second determination, the transfer may be performed. For example, an Application Attribute X 717 may be compared between the first application of the HMD 703 and the second application of a potential second device. Table 701 may be used for making the second determination. The second determination may reveal the second application on the desktop computer 709 may include Application Attribute X 717. The HMD 703 may perform the transfer to the desktop computer 709 based on the second determination. In one example, an application attribute may not be provided on any of the potential second devices. The transfer may not be performed based on the second determination. Examples of application attributes may be an attribute associated with editing photos, an attribute for uploading digital content to a server, an attribute for proofreading text, an attribute for browsing a web page, an attribute for making a phone or video call, among other potential attributes.

In one example, the table 701 may be used for a second determination made about Screen Resolution Y 719. The Screen Resolution Y 719 may be a specific desirable display resolution (e.g., 1920×1080, 320×480, etc.) or a threshold value of pixel density. For example, tablet 705 may include a pixel density greater than or equal to Screen Resolution Y 719.

Figure 8:
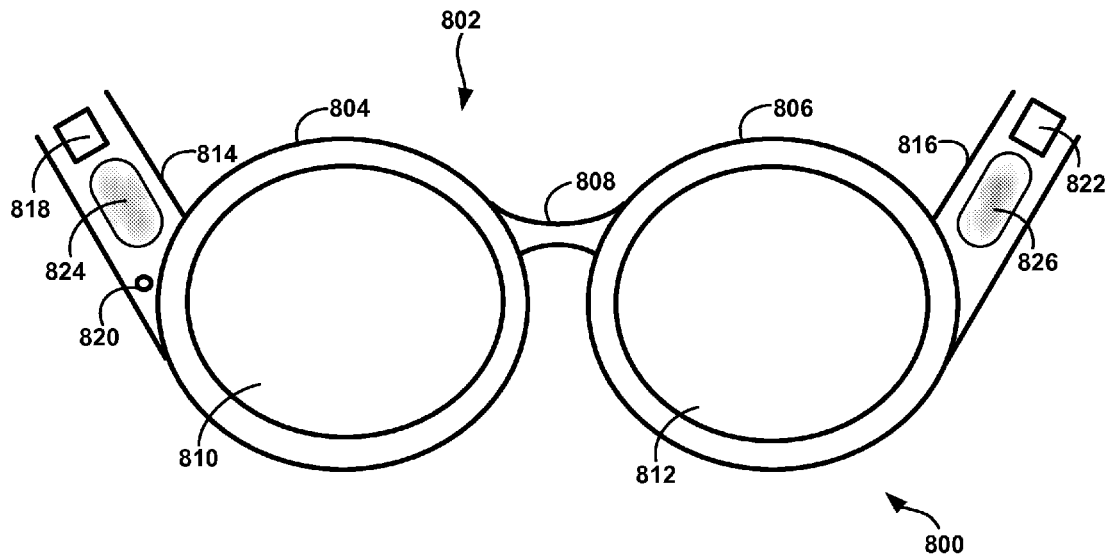
FIG. 8 illustrates an example system for receiving, transmitting, and displaying data.

The above-referenced HMD may be a system for receiving, transmitting, and displaying data. FIG. 8 illustrates an example system 800 for receiving, transmitting, and displaying data. The system 800 is shown in the form of a HMD. While FIG. 8 illustrates eyeglasses 802 as an example of a HMD, other types of HMDs could additionally or alternatively be used. As illustrated in FIG. 8, the eyeglasses 802 comprise frame elements including lens-frames 804 and 806 and a center frame support 808, lens elements 810 and 812, and extending side-arms 814 and 816. The center frame support 808 and the extending side-arms 814 and 816 are configured to secure the eyeglasses 802 to a user's face via a user's nose and ears, respectively. Each of the frame elements 804, 806, and 808 and the extending side-arms 814 and 816 may be formed of a solid structure of plastic or metal, or may be formed of a hollow structure of similar material so as to allow wiring and component interconnects to be internally routed through the eyeglasses 802. Each of the lens elements 810 and 812 may be formed of a material configured to display a projected image or graphic. Each of the lens elements 810 and 812 may also be sufficiently transparent to allow a user to see through the lens element. In one example, combining these two features of the lens elements 810 and 812 can facilitate an augmented reality or heads-up display where a projected image or graphic may be superimposed over a real-world view as perceived by the user through the lens elements 810 and 812.

The extending side-arms 814 and 816 are each projections that extend away from the frame elements 804 and 806, respectively, and are positioned behind a user's ears to secure the eyeglasses 802 to the user. The extending side-arms 814 and 816 may further secure the eyeglasses 802 to the user by extending around a rear portion of the user's head. Additionally or alternatively, for example, the system 800 may connect to or be affixed within a head-mounted helmet structure. Other possibilities exist as well.

The system 800 may also include an on-board computing system 818, a video camera 820, a sensor 822, and finger-operable touch pads 824, 826. The on-board computing system 818 is shown to be positioned on the extending side-arm 814 of the eyeglasses 802; however, the on-board computing system 818 may be provided on other parts of the eyeglasses 802. The on-board computing system 818 may include a processor and memory, for example. The on-board computing system 818 may be configured to receive and analyze data from the video camera 820 and the finger-operable touch pads 824, 826 (and possibly from other sensory devices, user interfaces, or both) and generate images for output to the lens elements 810 and 812.

The video camera 820 is shown to be positioned on the extending side-arm 814 of the eyeglasses 802; however, the video camera 820 may be provided on other parts of the eyeglasses 802. The video camera 820 may be configured to capture images at various resolutions or at different frame rates. Many video cameras with a small form-factor, such as those used in cell phones or webcams, for example, may be incorporated into an example of the system 800. Although FIG. 8 illustrates one video camera 820, more video cameras may be used, and each may be configured to capture the same view, or to capture different views. For example, the video camera 820 may be forward facing to capture at least a portion of the real-world view perceived by the user. This forward facing image captured by the video camera 820 may then be used to generate an augmented reality where computer generated images appear to interact with the real-world view perceived by the user.

The sensor 822 is shown mounted on the extending side-arm 816 of the eyeglasses 802; however, the sensor 822 may be provided on other parts of the eyeglasses 802. The sensor 822 may include one or more of a gyroscope or an accelerometer, for example. Other sensing devices may be included within the sensor 822 or other sensing functions may be performed by the sensor 822.

The finger-operable touch pads 824, 826 are shown mounted on the extending side-arms 814, 816 of the eyeglasses 802. Each of finger-operable touch pads 824, 826 may be used by a user to input commands. The finger-operable touch pads 824, 826 may sense at least one of a position and a movement of a finger via capacitive sensing, resistance sensing, or a surface acoustic wave process, among other possibilities. The finger-operable touch pads 824, 826 may be capable of sensing finger movement in a direction parallel or planar to the pad surface, in a direction normal to the pad surface, or both, and may also be capable of sensing a level of pressure applied. The finger-operable touch pads 824, 826 may be formed of one or more translucent or transparent insulating layers and one or more translucent or transparent conducting layers. Edges of the finger-operable touch pads 824, 826 may be formed to have a raised, indented, or roughened surface, so as to provide tactile feedback to a user when the user's finger reaches the edge of the finger-operable touch pads 824, 826. Each of the finger-operable touch pads 824, 826 may be operated independently, and may provide a different function.

Figure 9:
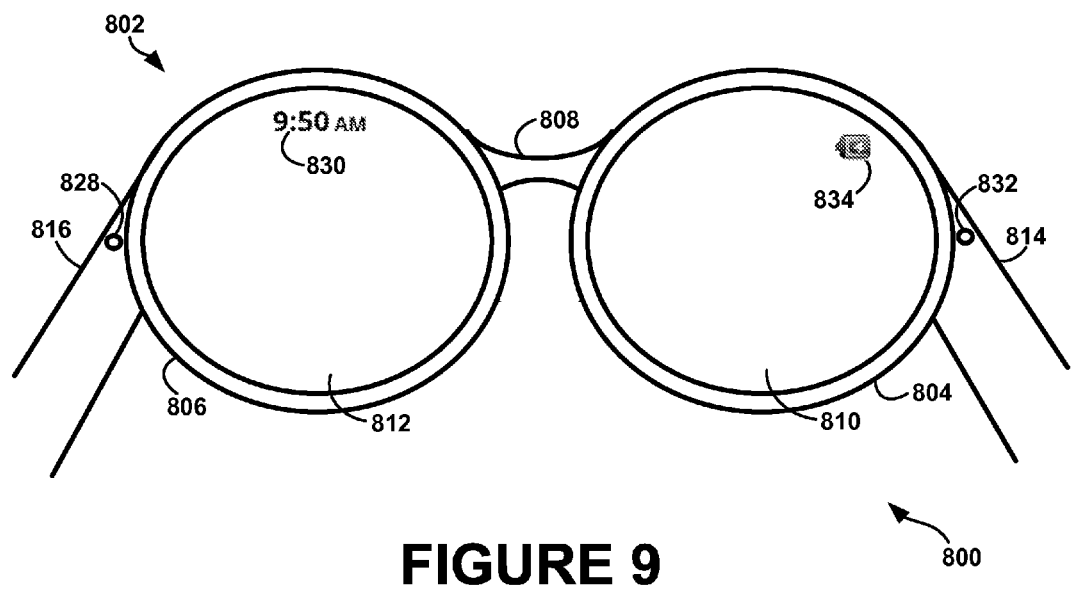
FIG. 9 illustrates an alternate view of the system of FIG. 8.

FIG. 9 illustrates an alternate view of the system 800 of FIG. 8. As shown in FIG. 9, the lens elements 810 and 812 may act as display elements. The eyeglasses 802 may include a first projector 828 coupled to an inside surface of the extending side-arm 816 and configured to project a display 830 onto an inside surface of the lens element 812. Additionally or alternatively, a second projector 832 may be coupled to an inside surface of the extending side-arm 814 and may be configured to project a display 834 onto an inside surface of the lens element 810.

The lens elements 810 and 812 may act as a combiner in a light projection system and may include a coating that reflects the light projected onto the lens elements 810 and 812 from the projectors 828 and 832. In some embodiments, a special coating may not be used (e.g., when the projectors 828 and 832 are scanning laser devices).

In alternative embodiments, other types of display elements may also be used. For example, the lens elements 810, 812 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 804 and 806 for driving such a matrix display. Alternatively or additionally, a laser or LED source and scanning system could be used to draw a raster display directly onto the retina of one or more of the user's eyes. Other possibilities exist as well.

Figure 10:
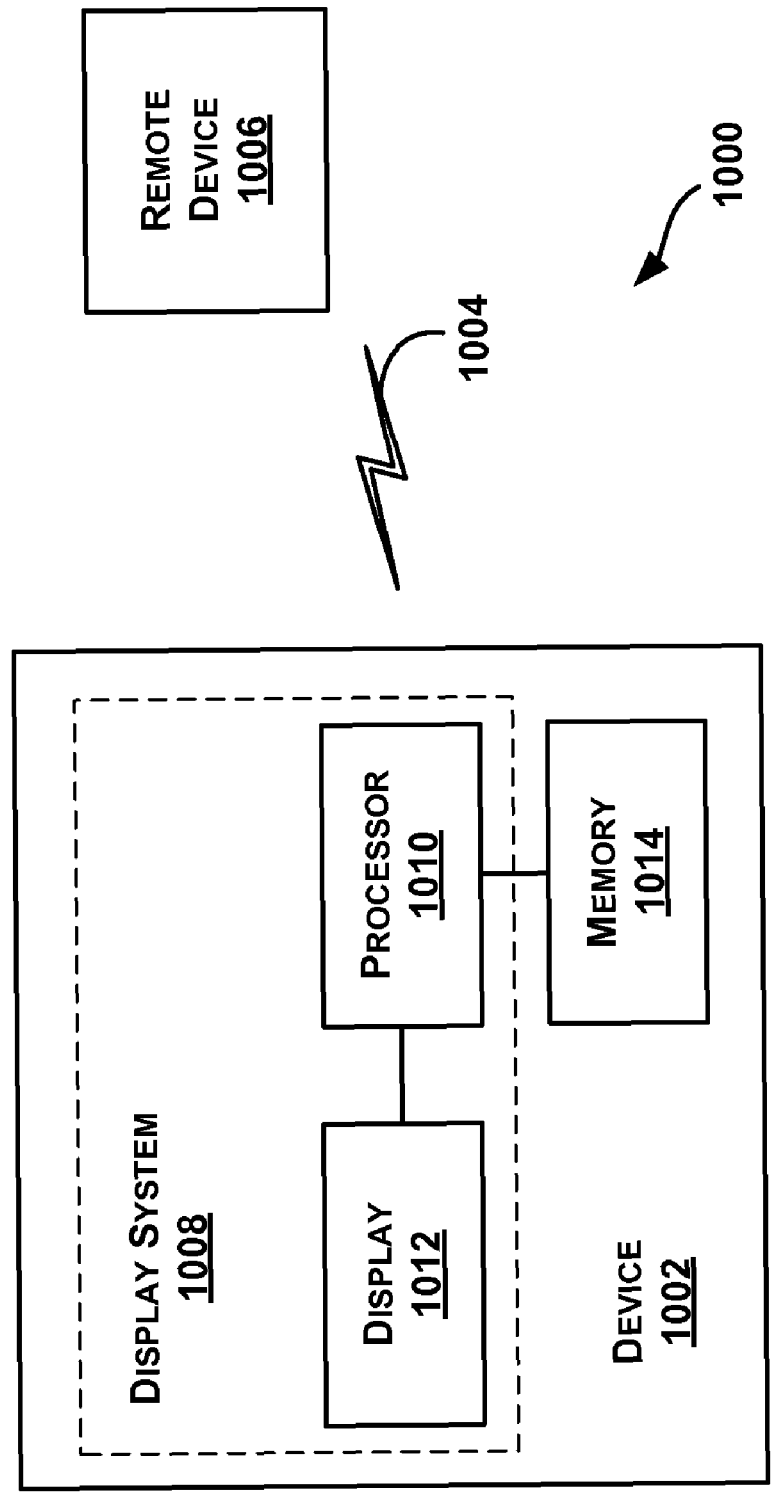
FIG. 10 illustrates an example schematic drawing of a computer network infrastructure, in which a HMD may operate.

Referring now to FIG. 10, an example schematic drawing of a computer network infrastructure 1000 is illustrated, in which a HMD may operate. The computer network infrastructure 1000 includes a device 1002 configured to communicate using a communication link 1004 (e.g., a wired or wireless connection) to a remote device 1006. The device 1002 may be any type of device that can receive data and display information corresponding to or associated with the data. For example, the device 1002 may be a heads-up display system, such as the eyeglasses 802 described with reference to FIGS. 8 and 9.

Thus, the device 1002 may include a display system 1008 comprising a processor 1010 and a display 1012. The display 1012 may be, for example, an optical see-through display, an optical see-around display, or a video see-through display. The processor 1010 may receive data from the remote device 1006, and configure the data for display on the display 1012. The processor 1010 may be any type of processor, such as a micro-processor or a digital signal processor, for example.

The device 1002 may further include on-board data storage, such as memory 1014, coupled to the processor 1010. The memory 1014 may store software that can be accessed and executed by the processor 1010, for example.

The remote device 1006 may be any type of computing device or transmitter including a laptop computer, a mobile telephone, etc., that is configured to transmit data to the device 1002. The remote device 1006 and the device 1002 may contain hardware to enable the communication link 1004, such as processors, transmitters, receivers, antennas, etc.

In FIG. 10, the communication link 1004 is illustrated as a wireless connection. The wireless connection may include using, e.g., Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. Wired connections may also be used. For example, the communication link 1004 may be a wired link via a serial bus such as a universal serial bus or a parallel bus. A wired connection may be a proprietary connection as well. The remote device 1006 may be accessible, using wired or wireless links, via the Internet and may comprise a computing cluster associated with a particular web service (e.g., social-networking, photo sharing, address book, etc.).

Figure 11:
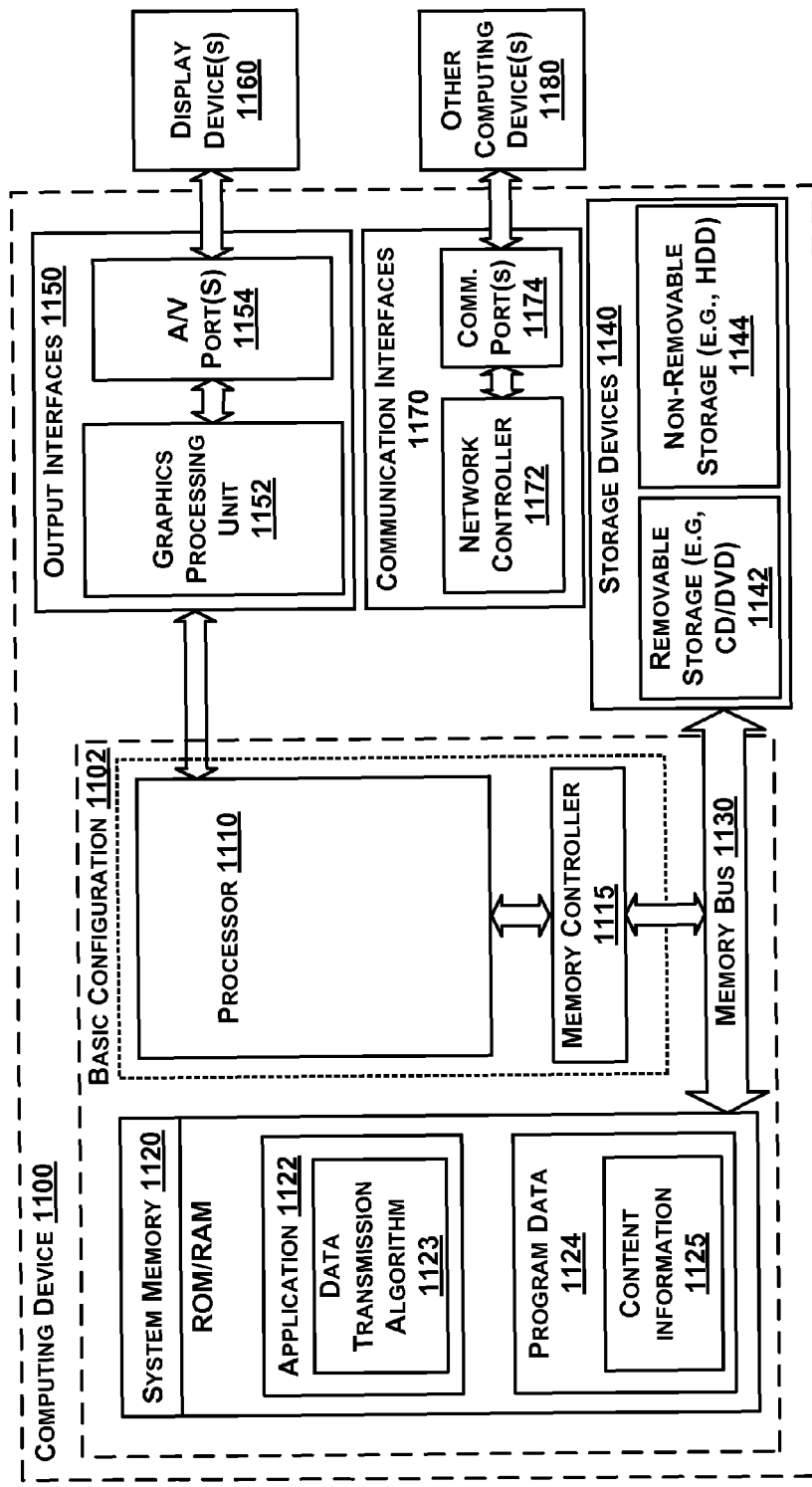
FIG. 11 is a functional block diagram illustrating an example computing device used in a computing system that is arranged in accordance with at least some embodiments described herein.

FIG. 11 is a functional block diagram illustrating an example computing device 1100 used in a computing system that is arranged in accordance with at least some embodiments described herein. The computing device may be implemented as a HMD, first device, or second device as described in FIGS. 1-10. In a very basic configuration 1102, computing device 1100 may typically include one or more processors 1110 and system memory 1120. A memory bus 1130 can be used for communicating between the processor 1110 and the system memory 1120. Depending on the desired configuration, processor 1110 can be of any type including but not limited to a microprocessor (µP), a microcontroller (µC), a digital signal processor (DSP), or any combination thereof. A memory controller 1115 can also be used with the processor 1110, or in some implementations, the memory controller 1115 can be an internal part of the processor 1110.

Depending on the desired configuration, the system memory 1120 can be of any type including but not limited to volatile memory (such as RAM), non-volatile memory (such as ROM, flash memory, etc.) or any combination thereof. System memory 1120 may include one or more applications 1122, and program data 1124. Application 1122 may include an image display algorithm 1123 that is arranged to provide inputs to the electronic circuits, in accordance with the present disclosure. Program data 1124 may include content information 1125 that could be directed to any number of types of data. In some example embodiments, application 1122 can be arranged to operate with program data 1124 on an operating system.

Computing device 1100 can have additional features or functionality, and additional interfaces to facilitate communications between the basic configuration 1102 and any devices and interfaces. For example, data storage devices 1140 can be provided including removable storage devices 1142, non-removable storage devices 1144, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 1120 and storage devices 1140 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media can be part of device 1100.

Computing device 1100 can also include output interfaces 1150 that may include a graphics processing unit 1152, which can be configured to communicate to various external devices such as display devices 1160 or speakers via one or more A/V ports or a communication interface 1170. The communication interface 1170 may include a network controller 1172, which can be arranged to facilitate communications with one or more other computing devices 1180 over a network communication via one or more communication ports 1174. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 1100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 can also be implemented as a personal computer including both laptop computer and non-laptop computer configurations.

In some embodiments, the disclosed methods may be implemented as computer program instructions encoded on a non-transitory computer-readable storage media in a machine-readable format, or on other non-transitory media or articles of manufacture. FIG. 12 is a schematic illustrating a conceptual partial view of an example computer program product 1200 that includes a computer program for executing a computer process on a computing device, arranged according to at least some embodiments presented herein. In one embodiment, the example computer program product 1200 is provided using a signal bearing medium 1201. The signal bearing medium 1201 may include one or more programming instructions 1202 that, when executed by one or more processors may provide functionality or portions of the functionality described above with respect to FIGS. 1-11. Thus, for example, referring to the embodiments shown in FIG. 2, one or more features of blocks 201-207 may be undertaken by one or more instructions associated with the signal bearing medium 1201.

In some examples, the signal bearing medium 1201 may encompass a computer-readable medium 1203, such as, but not limited to, a hard disk drive, a Compact Disc (CD), a Digital Video Disk (DVD), a digital tape, memory, etc. In some implementations, the signal bearing medium 1201 may encompass a computer recordable medium 1204, such as, but not limited to, memory, read/write (R/W) CDs, R/W DVDs, etc. In some implementations, the signal bearing medium 1201 may encompass a communications medium 1205, such as, but not limited to, a digital and/or an analog communication medium (e.g., a fiber optic cable, a waveguide, a wired communications link, a wireless communication link, etc.). Thus, for example, the signal bearing medium 1201 may be conveyed by a wireless form of the communications medium 1205 (e.g., a wireless communications medium conforming to the IEEE 802.11 standard or other transmission protocol).

The one or more programming instructions 1202 may be, for example, computer executable and/or logic implemented instructions. In some examples, a computing device such as the computing device 1100 of FIG. 11 may be configured to provide various operations, functions, or actions in response to the programming instructions 1202 conveyed to the computing device 1200 by one or more of the computer readable medium 1203, the computer recordable medium 1204, and/or the communications medium 1205.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
storing contextual information that associates a state of a head-mounted display (HMD) with information that is associated with an interaction with a first application on the HMD to describe an interaction state on the HMD, wherein the state of the HMD comprises information about one or more applications of the HMD which are executed to provide predetermined functionality;
selecting a second device capable to provide access to the interaction state on the second device via a second application using the stored contextual information;
making a determination of attributes of the second device; and
based on the determination, the HMD transferring to the second device the stored contextual information and information associated with a user input to the first application on the HMD such that the second device is capable to provide via the second application access to the interaction state according to the user input to the first application.

2. The method of claim 1, wherein the contextual information further comprises a state of the first application based on the interaction with the first application.

3. The method of claim 1, wherein the state of the HMD comprises:
information about a functionality of the HMD;
information about applications functioning on the HMD; and
information about peripheral devices of the HMD.

4. The method of claim 1, wherein the HMD transferring to the second device the stored contextual information and information associated with a user input to the first application on the HMD comprises transferring via a server residing in a network.

5. The method of claim 1, wherein the HMD transferring to the second device the stored contextual information and information associated with a user input to the first application on the HMD comprises transferring directly from the HMD to the second device.

6. The method of claim 1, wherein the first application and the second application are the same application.

7. The method of claim 1, wherein the first application is a mobile version of the second application such that the first application has less functionality than the second application.

8. The method of claim 1, further comprising:
capturing an image of an environment using a camera of the HMD;
determining the image of the environment comprises an image of the second device; and
responsively, the HMD performing the transfer to the second device.

9. The method of claim 1, wherein the contextual information describes an occurrence of digital content accessed on the HMD using the first application.

10. The method of claim 9, wherein the occurrence of digital content comprises a document accessed on the HMD, the method further comprising transferring to the second device information associated with the document such that the second device is capable to reply to the document via the second application.

11. The method of claim 10, wherein the document comprises an email message, the method further comprising starting a reply email message on the HMD and transferring the reply email message to the second device to be completed, wherein the second device is capable to populate the reply email message on the second device using the information associated with the email message.

12. The method of claim 9, wherein the occurrence of digital content comprises a web page accessed on the HMD via a first display, the method further comprising transferring to the second device information associated with the webpage such that the second device is capable to provide access to the webpage on a second display with greater resolution than the first display.

13. The method of claim 9, wherein the HMD identifies the occurrence of digital content, the method further comprising the HMD providing a notification to perform the transfer to the second device.

14. The method of claim 1, wherein the first application on the HMD is provided as a service by a server during a first session, the method further comprising providing the stored contextual information and information associated with the user input to the first application on the HMD as a link to the server, such that the second device is capable to provide access to the interaction state according to the user input to the first application using the link.

15. The method of claim 1, further comprising the HMD receiving from the second device the stored contextual information and information associated with a user input to the second application on the second device such that the HMD is capable to provide via the first application access to the interaction state according to the user input to the second application.

16. A non-transitory computer readable medium having stored therein instructions executable by a computing device to cause the computing device to perform functions of:
storing contextual information that associates a state of a head-mounted display (HMD) with information that is associated with an interaction with a first application on the HMD to describe an interaction state on the HMD, wherein the state of the HMD comprises information about one or more applications of the HMD which are executed to provide predetermined functionality;
selecting a second device capable to provide access to the interaction state on the second device via a second application using the stored contextual information;
making a determination of attributes of the second device; and
based on the determination, the HMD transferring to the second device the stored contextual information and information associated with a user input to the first application on the HMD such that the second device is capable to provide via the second application access to the interaction state according to the user input to the first application.

17. The computer readable medium of claim 16, wherein making the determination of attributes of the second device comprises accessing a database to determine attributes of the second device.

18. A head-mounted display (HMD) comprising:
a memory;
a processor coupled to the memory; and
instructions stored in the memory and executable by the processor to perform functions of:
storing contextual information that associates a state of the HMD with information that is associated with an interaction with a first application on the HMD to describe an interaction state on the HMD, wherein the state of the HMD comprises information about one or more applications of the HMD which are executed to provide predetermined functionality;

selecting a second device capable to provide access to the interaction state on the second device via a second application using the stored contextual information;

making a determination of attributes of the second device; and based on the determination, the HMD transferring to the second device the stored contextual information and information associated with a user input to the first application on the HMD such that the second device is capable to provide via the second application access to the interaction state according to the user input to the first application.

19. The HMD of claim 18, wherein selecting a second device capable to provide access to the interaction state via the second application comprises selecting the second device from one or more devices registered with the HMD.

* * * * *